(12) United States Patent
Shah

(10) Patent No.: US 7,074,297 B2
(45) Date of Patent: Jul. 11, 2006

(54) METHOD FOR FORMING A HOT MELT ADHESIVE

(75) Inventor: Pankaj Vinubhai Shah, Crystal Lake, IL (US)

(73) Assignee: Rohm and Haas Company, Philadelphia, PA (US)

( * ) Notice: Subject to any disclaimer, the term of this patent is extended or adjusted under 35 U.S.C. 154(b) by 195 days.

(21) Appl. No.: 09/927,009

(22) Filed: Aug. 9, 2001

(65) Prior Publication Data

US 2002/0056518 A1  May 16, 2002

Related U.S. Application Data

(60) Provisional application No. 60/234,261, filed on Sep. 21, 2000.

(51) Int. Cl.
  *C09J 5/02*  (2006.01)
(52) U.S. Cl. .............. 156/308.8; 156/331.4; 156/331.7; 525/440; 525/457
(58) Field of Classification Search .......... 156/308.8, 156/331.4, 331.7; 525/440, 457
  See application file for complete search history.

(56) References Cited

U.S. PATENT DOCUMENTS

| 4,408,008 | A | * | 10/1983 | Markusch | 524/591 |
| 4,814,373 | A | * | 3/1989 | Frankel et al. | 524/460 |
| 4,891,269 | A | | 1/1990 | Markevka et al. | 428/423 |
| 5,155,180 | A | | 10/1992 | Takada et al. | 525/440 |
| 5,162,457 | A | * | 11/1992 | Hansel et al. | 525/454 |
| 5,194,487 | A | * | 3/1993 | Jacobs | 524/591 |
| 5,441,808 | A | | 8/1995 | Anderson et al. | 428/349 |
| 5,668,222 | A | | 9/1997 | McKinley et al. | 525/415 |
| 5,939,499 | A | | 8/1999 | Anderson et al. | 525/440 |
| 6,365,700 | B1 | * | 4/2002 | Graham | 528/60 |

FOREIGN PATENT DOCUMENTS

WO   WO 91/15530 A1   10/1991
WO   WO 00/75209 A1   12/2000

* cited by examiner

*Primary Examiner*—Jeff H. Aftergut
*Assistant Examiner*—John L. Goff
(74) *Attorney, Agent, or Firm*—Stephen T. Falk

(57) ABSTRACT

A method for forming an isocyanate-functional moisture reactive hot melt adhesive by first forming a hydroxyl-functional prepolymer from a polyol selected from the group including polyester polyols, polyether polyols, and mixtures thereof and a polyisocyanate and subsequently forming the moisture reactive hot melt adhesive from the hydroxyl-functional prepolymer, a polyol selected from the group including polyester polyols, polyether polyols, and a polyisocyanate is provided. An isocyanate-functional moisture reactive hot melt adhesive formed by the method of the present invention and a method for bonding substrates are also provided.

4 Claims, No Drawings

METHOD FOR FORMING A HOT MELT ADHESIVE

CROSS REFERENCE TO RELATED PATENT APPLICATIONS

This is a non-provisional application of prior pending U.S. provisional application Ser. No. 60/234,261 filed Sep. 21, 2000.

This invention relates to a method for forming a hot melt adhesive, particularly a moisture reactive hot melt adhesive; a moisture reactive hot melt adhesive made by the method; and a method for bonding substrates, such as structural components, using the adhesive. More particularly this invention relates to a method for forming a isocyanate-functional moisture reactive hot melt adhesive by first forming a hydroxyl-functional prepolymer from a polyol selected from the group including polyester polyols, polyether polyols, and mixtures thereof and a polyisocyanate and subsequently forming the moisture reactive hot melt adhesive from the hydroxyl-functional prepolymer, a polyol selected from the group including polyester polyols, polyether polyols, and a polyisocyanate.

Hot melt adhesives are desirable for their quick setting and for the absence of aqueous or solvent media which provide fluidity to other types of adhesives. Moisture reactive hot melt adhesives which are based on an isocyanate group-containing urethane can be designed to yield a relatively low melt viscosity for facile handling and application; reaction with moisture augments the final properties of the adhesive.

U.S. Pat. No. 5,939,499 discloses a hot melt polyurethane adhesive composition which is a two component system, namely, a mixture of an isocyanate-functional prepolymer based on a polyether polol, a polyester polyol, or mixtures thereof, and a polyether polyester thermoplastic elastomer.

The problem faced by the inventor is the provision of an alternative method for forming a moisture reactive hot melt adhesive combines both polyester and, optionally, lower cost polyether precursors in a single efficacious composition which functions as a pressure sensitive adhesive before curing and as a strong bonding adhesive after moisture cure. Preferably the process may be effected in a sequential manner in a single reactor.

According to a first aspect of the present invention there is provided a method for forming a moisture reactive hot melt adhesive including a) forming a hydroxyl-functional prepolymer by reacting first components including a polyol selected from the group including polyether polyols, polyester polyols, and mixtures thereof and a polyisocyanate, the overall ratio of OH/NCO groups of the first components on an equivalents basis being from 1.05 to 3.0; b) admixing second components including the hydroxyl-functional prepolymer, a polyol selected from the group including polyester polyols, polyether polyols, and a polyisocyanate, the weight ratio of the hydroxyl-functional prepolymer to the crystalline polyester polyol being from 9/1 to 1/9, and the ratio of NCO/OH groups of the second components on an equivalents basis being from 1.5 to 2.2; and c) reacting, or allowing to react, the admixture.

According to a second aspect of the present invention there is provided a moisture reactive hot melt adhesive formed by the method of the first aspect of the present invention.

According to a third aspect of the present invention there is provided a method for bonding substrates including forming a moisture reactive hot melt adhesive by the method of the first aspect of the present invention; heating the hot melt adhesive to a temperature of 90° C. to 140° C.; applying the heated hot melt adhesive to a first substrate in the presence of moisture; contacting the applied heated hot melt adhesive with a second substrate; and cooling, or allowing to cool, the adhesive.

The composition of this invention is a moisture reactive hot melt adhesive composition. By "moisture reactive" is meant herein that the composition contains isocyanate groups which are capable of reacting with water desirably to effect an increase in the molecular weight of the adhesive composition and/or effect crosslinking of the adhesive composition so as to increase the strength properties of the adhesive subsequent to being contacted with water. By "hot melt" is meant herein that the adhesive which may be a solid, semi-solid or viscous mass can be advantageously heated to provide a fluid adhesive of a viscosity suitable for application to and adhesion to substrates. By "open time" is meant herein the time between the application of the adhesive to a first substrate and contacting the applied adhesive with a second substrate.

The method for forming a moisture reactive hot melt adhesive of the present invention includes forming a hydroxyl-functional prepolymer by reacting first components including a polyol selected from the group including polyether polyols, polyester polyols, and mixtures thereof and a polyisocyanate, the ratio of OH/NCO groups of the first components on an equivalents basis being from 1.05 to 3.0.

The polyether polyol and the polyester polyol which may be used for forming the hydroxyl-functional prepolymer may be independently selected from crystalline, semi-crystalline, or amorphous polyols; generally increasing crystalline polyol content increases bond strength development and decreases open time. The polyols preferably have a weight average molecular weight ("Mw") as measured by gel permeation chromatograph, from 250 to 8,000, more preferably from 250 to 5,000.

Suitable polyester polyols include those formed from diacids, or their monoester, diester, or anhydride counterparts, and diols. The diacids may be saturated $C_4$–$C_{12}$ aliphatic acids, including branched, unbranched, or cyclic materials, and/or $C_8$–$C_{15}$ aromatic acids. Examples of suitable aliphatic acids include, for example, succinic, glutaric, adipic, pimelic, suberic, azelaic, sebacic, 1,12-dodecanedioic, 1,4-cyclohexanedicarboxylic, and 2-methylpentanedioic acids. Examples of suitable aromatic acids include, for example, terephthalic, isophthalic, phthalic, 4,4'-benzophenone dicarboxylic, and 4,4'-diphenylamine dicarboxylic acids. The diols may be $C_2$–$C_{12}$ branched, unbranched, or cyclic aliphatic diols. Examples of suitable diols include, for example, ethylene glycol, 1,3-propylene glycol, 1,2-propylene glycol, 1,4-butandediol, 1,3-butandediol, hexanediols, 2-methyl-2,4-pentanediol, cyclohexane-1,4-dimethanol, and 1,12-dodecanediol.

Suitable polyether diols include polyoxy-$C_2$–$C_6$-alkylene polyols, including branched and unbranched alkylene groups. Examples of suitable polyether diols include, for example, polyethylene oxide, poly(1,2- and 1,3-propyleneoxide), poly(1,2-butyleneoxide), and random or block copolymers of ethylene oxide and 1,2-propylene oxide.

For forming the hydroxyl-functional prepolymer at least one polyisocyanate, i.e., an isocyanate bearing at least two isocyanate groups is used. Suitable polyisocyanates include, for example, aromatic, aliphatic, cycloaliphatic polyisocyanates and combinations thereof, such as, for example, m-phenylene diisocyanate, 2,4-toluene diisocyanate, 2,6- toluene diisocyanate, hexamethylene diisocyanate, tetramethylene diisocyanate, 1,4-cyclohexane diisocyanate, hexahydrotoluene diisocyanate, 1,5-naphthalene diisocyanate, 1-methoxy-2,4-phenylene diisocyanate, 4,4'-diphenylmethane diisocyanate, 2,4-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate, 3,3'-dimethyl-4,4'-diphenylmethane diisocyanate, isophorone diisocyanate, 4,4',4''-triphenylmethane triisocyanate, polymethylene polyphenylene polyisocyanate, 2,4,6-toluene triisocyanate, and 4,4'-dimethyl-diphenylmethane tetraisocyanate, or prepolymers having Mn less than 2000 and bearing at least two isocyanate groups. Preferred is a mixture of 4,4'-diphenylmethane diisocyanate and 2,4-diphenylmethane diisocyanate.

The hydroxyl-functional prepolymer is formed by reacting the first components including a polyol selected from the group including polyether polyols, polyester polyols, and mixtures thereof and a polyisocyanate, the ratio of OH/NCO groups of the first components on an equivalents basis being from 1.05 to 3.0. The first components contain less than 1% water, preferably less than 0.1% water, by weight based on the total weight of the components. The first components may be mixed by conventional means, preferably in an inert, dry atmosphere, and reacted, preferably at a temperature of 80° C. to 120° C. Optionally, a catalyst such as, for example, a tertiary amine or a tin-based catalyst may be admixed with the components at a level of less than 0.3% by weight based on the total weight of the admixed components.

The method for forming a moisture reactive hot melt adhesive of the present invention includes admixing second components comprising the hydroxyl-functional prepolymer, a polyol selected from the group including polyester polyols, polyether polyols, and a polyisocyanate, the weight ratio of the hydroxyl-functional prepolymer to the crystalline polyester polyol being from 9/1 to 1/9, and the ratio of NCO/OH groups of the second components on an equivalents basis being from 1.5 to 2.2, preferably from 1.8 to 2.1; and reacting, or allowing to react, the admixture. The hydroxyl-functional prepolymer has been described hereinabove. The polyol may be crystalline, semi-crystalline, or amorphous and may be selected from those polyols described and exemplified herein-above and may be the same as or different from the polyol(s) used in forming the hydroxyl-functional prepolymer. Preferred is a polyol which is a crystalline polyester polyol. The at least one polyisocyanate may be selected from those polisocyanates described and exemplified herein-above and may be the same as or different from the polyisocyanates(s) used in forming the prepolymer.

The ratio of NCO/OH groups from all of the admixed second components taken on an equivalents basis is from 1.5 to 2.2, preferably from 1.8 to 2.1 in order to provide an adhesive composition with an excess of isocyanate groups. Higher levels of the NCO/OH ratio would result in higher than desired levels of free isocyanate monomer and lower levels of the NCO/OH ratio would result in higher than desired application viscosity. The second components contain less than 1% water, preferably less than 0.1% water, by weight based on the total weight of the components.

The second components may be mixed by conventional means, preferably in an inert, dry atmosphere, and reacted, preferably at a temperature of 80° C. to 120° C., preferably for a time sufficient to react substantially all of the hydroxyl groups. Optionally, a catalyst such as, for example, a tertiary amine or a tin-based catalyst may be admixed with the components at a level of less than 0.3% by weight based on the total weight of the admixed components, either before, during, or after the reaction to form the adhesive composition. The hot melt adhesive of this invention, which is a NCO-functional adhesive, is stored, preferably under an inert, dry atmosphere until use.

The hot melt adhesive may be formulated by admixing therewith additional conventional ingredients such as fillers, pigments, tackifiers, plasticizers, rheology modifiers, thermoplastic acrylic resins, etc. with due regard to the reactivity of the NCO-functional groups which are desirably maintained.

In the method for bonding substrates of the present invention the moisture reactive hot melt adhesive is heated to a temperature of 80–140° C., preferably to a temperature of 100° C. to 130° C., in order to achieve a viscosity suitable for transporting the adhesive, such as by pumping or gravity feed, to the application equipment and for the application of the adhesive to a first substrate in the presence of moisture. The application of the adhesive may be effected by conventional means such as, for example, heated spray applicator, heated bead applicator, heated nozzle, and heated roll coater, to form a continuous or discontinuous film of adhesive, as desired. The adhesive may typically be applied at a level of 3.7 to 18.6 kg/sq. meter (4–20 g/sq ft) although in cases where one of the substrates is a fabric it may be applied at a level as low as 1–40 g/sq. meter. It is contemplated that moisture, i.e., water, which is anticipated to effect reaction with the NCO-functional groups thereby increasing the ultimate cohesive strength of the applied adhesive, may be, for example, a result of ambient humidity, artificially increased or controlled humidified air, a mist of water droplets, or a spray of liquid water contacting the applied adhesive. It is further contemplated that the moisture may be augmented by other NCO-functional group-reactive ingredients such as, for example, amines. In alternative embodiments the reactive hot melt adhesive may be applied to a substantially dry first substrate in the absence of contact with moisture and either stored in the absence of moisture for subsequent use or contacted with a second substrate in the presence or absence of moisture.

Then, the applied adhesive is contacted by a second substrate to provide a laminate construction. The laminate construction so formed is optionally subjected to applied pressure such as by passing it between rollers typically under a pressure of 10 to 100 lbs per lineal inch depending on the strength and deformability of the substrate to effect increased contact of the substrates with the adhesive and the laminate construction is then cooled or allowed to cool. In another embodiment the adhesive may be simultaneously or sequentially applied to both surfaces of the first substrate which adhesive are then simultaneously or sequentially bonded to two further substrates, which may be the same or different. It is further contemplated that the laminate construction may subsequently be bonded to other substrate(s) using the same or a different adhesive before or after the process described herein.

The first and second substrates to be bonded in the method of this invention may be the same or different and include, for example, metal, wood, consolidated wood products, paper, woven and nonwoven fabrics, and plastics which may have smooth or structured surfaces and are provided in the form of rolls, sheets, films, foils, etc. They include, for example, lauan mahogany plywood, impregnated paper, extruded polstyrene foam, expanded polystyrene foam, fiberglass reinforced polyester, polyester fabric, high or low pressure laminate, plywood, aluminum, steel, PVC, and engineering plastics.

The following examples are presented to illustrate the invention and the results obtained by the test procedures.

Abbreviations
MDI=diphenylmethane diisocyanate
FRP=fiberglass reinforced plastic

EXAMPLE 1

Preparation of Moisture Reactive Hot Melt Adhesive Composition of the Invention by the Method of this Invention A reaction vessel was set up with, a gas inlet tube, thermometer, stirrer, vacuum, and a heating jacket. Polyols were preheated overnight at 75–85° C. to facilitate handling. 1755 g hexanediol adipate polyester polyol (Rucoflex S105P110 with a hydroxyl no.=110; M.W.=1000; RUCO Polymer, New York, N.Y.), 2421 g. polyether polyol (PPG 1025; M.W.=1000; PPG Ind., Pittsburgh, Pa.), and 3 g phenolic antioxidant (Irganox 245; Ciba-Geigy Corp., New York, N.Y.) were added to the reaction vessel and the temperature raised to 105° C. with stirring. After 30 minutes at 105° C. and a vacuum of 20 mm of mercury, the temperature was lowered to 90° C. 844 g of a 98/2 mixture of 4,4-MDI and 2,4-MDI (Bayer Inc., Pittsburgh, Pa.) was added and the temperature was held at 100–105° C. for one hour with stirring and under nitrogen. 3631 g. hexanediol adipate (a crystalline polyester polyol) (Rucoflex S105P55 with a hydroxyl no.=55; M.W.=2000) and 15 g vinyl tri-methoxysilane (Silquest A-171; OSI Specialties, Div. Of Witco Corp. New York, N.Y.) was added and the reaction temperature raised to 103–105° C.; vacuum of 20 mm of mercury was applied for minutes and the temperature allowed to fall to 90° C. 1324 g MDI was added; and exotherm was observed and the reaction temperature was held at 100–105° C. under nitrogen for one hour During the last 40 minutes, stirring speed was reduced and 200–300 mm Hg vacuum was applied. After a one hour hold 1 g benzoyl chloride and 6 g. JEFFCAT DMDEE were added. Mixing continued for an additional 30–40 minutes under nitrogen. At this time the reaction product was poured into a container which was then blanketed in dry nitrogen and sealed.

The product had a viscosity at 127° C. (260° F.)=11,000 cps (Spindle 28 at 10 rpm)

EXAMPLE 2

Evaluation of Moisture Reactive Hot Melt Adhesive

The adhesive of Example 1 was heated to 130 C. and applied to a first substrate at the noted coverage. After a period of time ("open time" herein) the adhesive was contacted with the second substrate in the presence of ambient moisture and the composite passed through a pinch roller at a pressure of 50–100 lbs. per lineal inch. The substrates used were lauan wood about ⅛ inch thick; primed Aluminum; and FRP. Flatwise tensile was determined by the method of ASTM C-297 using an Instron Model 4502 at a crosshead speed of 0.05 inch per minute. Lap shear was determined by the method of ASTM D-1002 using an Instron Model 4502 at a crosshead speed of 0.05 inch per minute. Aged specimens were subjected to three cycles of heat and cold according to ASTM D-1183 and then conditioned for one week at ambient temperature before testing.

TABLE 2.1

Flatwise Tensile - Substrates FRP/Wood aged 3 cycles
(Coverage - 11.1 g/sq. ft.)

| Open Time (min.) | Flatwise Tensile (psi) | Failure type |
|---|---|---|
| 1 | 254 | 100% wood |
| 3 | 204 | 100% wood |
| 5 | 202 | 100% wood |

TABLE 2.2

Lap shear - Substrates FRP/Wood aged 3 cycles
(Coverage - 11.1 g/sq. ft.)

| Open Time (min.) | Lap shear (psi) | Failure type |
|---|---|---|
| 1 | 348 | 100% wood |
| 3 | 316 | 100% wood |
| 5 | 255 | 100% wood |

TABLE 2.3

Flatwise tensile strength at various temperatures - Substrates
Al/Wood (Open time = 2 min.; Coverage - 11.1 g/sq. ft.)

| Temperature | Flatwise Tensile (psi) | Failure type |
|---|---|---|
| −40 C. (−40 F.) | 251 | 100% wood |
| (75 F.) | 137 | 100% wood |
| (180 F.) | 100 | 100% wood |

TABLE 2.4

Lap shear strength at various temperatures - Substrates Al/Wood
(Open time = 2 min.; Coverage - 11.1 g/sq. ft.)

| Temperature | Lap shear (psi) | Failure type |
|---|---|---|
| −40 C. (−40 F.) | 122 | 100% wood |
| (75 F.) | 140 | 100% wood |
| (180 F.) | 172 | 100% wood |

TABLE 2.5

Lap shear strength at various temperatures - Substrates FRP/Wood
(Coverage - 11.1 g/sq. ft.)

| Temperature | Open time = 1 min Lap shear (psi) | Open time = 3 min Lap shear (psi) | Open time = 5 min Lap shear (psi) |
|---|---|---|---|
| −40 C. (−40 F.) | 187 | 140 | 270 |
| (75 F.) | 181 | 431 | 455 |
| (180 F.) | 151 | 208 | 250 |

Note: All failures were 100% wood failure.

The applied adhesive was observed to be aggressively tacky. The green strength of the laminates were all acceptable. The method for bonding substrates of this invention including the moisture reactive hot melt adhesive of this invention formed by the method of this invention provides a useful level of adhesive performance.

What is claimed is:

1. A method for forming a moisture reactive hot melt adhesive comprising a) forming a hydroxyl-functional prepolymer by reacting first components comprising a polyol selected from the group consisting of polyether polyols, polyester polyols, and mixtures thereof, said polyol having a weight average molecular weight of 250 to less than 2,000; and a polyisocyanate, the ratio of OH/NCO groups of said first components on an equivalents basis being from 1.05 to 3.0;

b) admixing second components comprising said hydroxyl-functional prepolymer, a polyol selected from the group consisting of polyether polyols, polyester polyols, and mixtures thereof, and a polyisocyanate, the weight ratio of said hydroxyl-functional prepolymer to said polyol being from 9/1 to 1/9, and the ratio of NCO/OH groups of said second components on an equivalents basis being from 1.5 to 2.2; and c) reacting, or allowing to react, said admixture.

2. The method of claim 1 wherein said second components comprise said hydroxyl-functional prepolymer, a crystalline polyester polyol, and a polyisocyanate, the weight ratio of said hydroxyl-functional prepolymer to said polyol being from 9/1 to 1/9, and the ratio of NCO/OH groups of said second components on an equivalents basis being from 1.5 to 2.2.

3. A moisture reactive hot melt adhesive formed by the method of claim 1 or claim 2.

4. A method for bonding substrates comprising forming a moisture reactive hot melt adhesive by the method of claim 1 or claim 2;

heating said hot melt adhesive to a temperature of 90° C. to 140° C.;

applying said heated hot melt adhesive to a first substrate in the presence of moisture;

contacting said applied heated hot melt adhesive with a second substrate; and cooling, or allowing to cool, said adhesive.

* * * * *